(No Model.)
G. A. HASLUP.
CAR COUPLING.
No. 472,877. Patented Apr. 12, 1892.
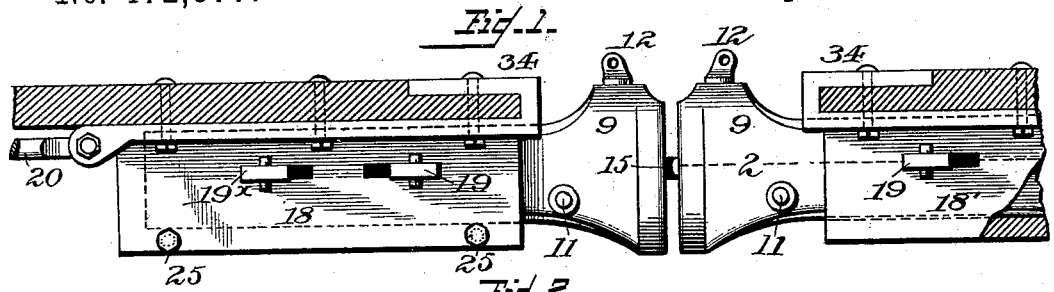
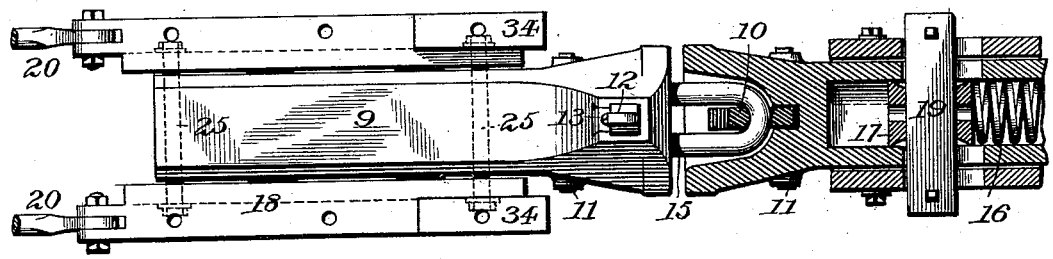
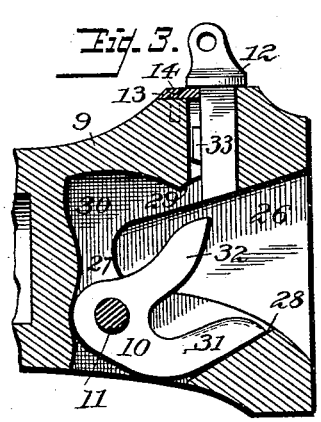
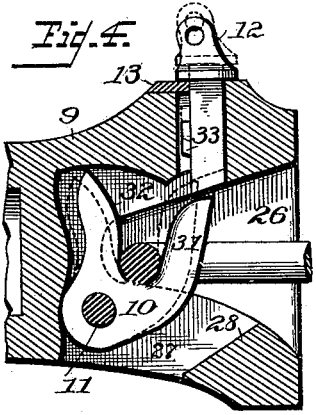
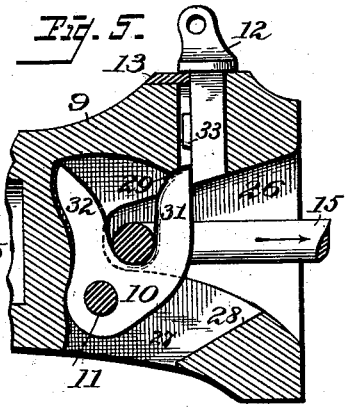
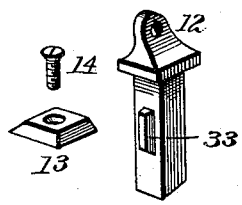
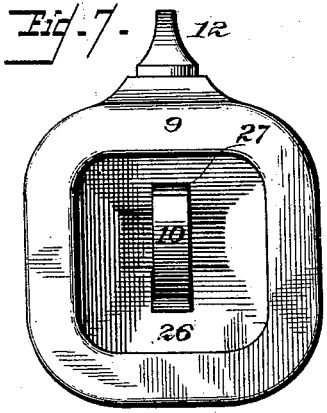
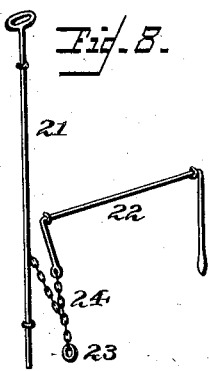
Witnesses:
Inventor:
Gilbert A. Haslup, United States Patent Office.

GILBERT A. HASLUP, OF LAUREL, MARYLAND.

CAR-COUPLING.

SPECIFICATION forming part of Letters Patent No. 472,877, dated April 12, 1892.

Application filed December 16, 1891. Serial No. 415,249. (No model.)

*To all whom it may concern:*

Be it known that I, GILBERT A. HASLUP, a citizen of the United States of America, and a resident of Laurel, in the State of Maryland, have invented a new and useful Improvement in Car-Couplings, of which the following is a specification.

This invention relates to automatic couplings designed for freight-cars and adapted to couple with cars having the old-fashioned link-and-pin draw-heads still extensively used.

The improved coupling is of that kind in which a "rolling" or oscillating detent coacts with a gravitating catch to hold the link.

The objects of the present invention are to provide for coupling up the draw-heads as close as may be desired to prevent any alteration of the peculiar shape of the detent by coupling and hauling strains, to insure automatically uncoupling the link as soon as the catch is raised, so that it shall not be necessary to hold or fasten the catch in its elevated position, and to render the improved coupling and its necessary accessories as simple and light as may be consistent with the required resistance to strain.

A sheet of drawings accompanies this specification as part thereof.

Figures 1 and 2 of the drawings are respectively an elevation and a top view of a pair of the improved couplings, partly in section, showing preferred accessories and a modification of the latter. Figs. 3, 4, and 5 are a series of vertical sections, enlarged one diameter from Figs. 1 and 2, illustrating the operation of the coupling proper. Fig. 6 is an end view of the latter, as in Fig. 3. Fig. 7 is a perspective view of the gravitating catch and its accessories detached, and Fig. 8 is a small-scale perspective view of proposed uncoupling devices.

Like reference-numbers indicate corresponding parts in the several figures.

The parts, as a whole, represented in the drawings are a pair of draw-heads 9, a detent 10 in each draw-head, a transverse horizontal pivot-pin 11 for each detent, a pin-shaped gravitating catch 12, a dovetailed catch-securing slide 13, and a countersunk screw 14 for fastening the latter in each draw-head, a short link 15, a combined buffer and draw-spring 16, Fig. 2, and a pair of followers 17 $17^\times$, within a tubular extension of each draw-head, metallic "draw-boxes" 18 18', within which said extensions of the draw-heads slide, flat bars 19 $19^\times$, passing through said followers 17 and $17^\times$, respectively, and sliding in longitudinal slots in the sides of each draw-head extension and its inclosing draw-box, tension-rods 20, a pair to each car, extending from one draw-box to the other, and in Fig. 8 a vertically-sliding uncoupling-rod 21, a combined hand-lever and rock-shaft 22, and a ring and chains 23 24 for connecting the catch 12 with either or both of said accessories 21 and 22 at both ends of each car, together with some minor detail parts, some of which are hereinafter specified. It will be seen that there need be very few distinct parts and that these may be of simple shapes and of any required strength.

The draw-boxes 18 and $18^\times$, Figs. 1 and 2, differ in that the former is bottomless and provided at bottom with transverse tie-bolts 25, to each of which a piece of gas-pipe is loosely fitted to form anti-friction rollers upon which the draw-head rests. Otherwise only one construction of parts is represented and the remainder of the description will be confined for clearness to one draw-head and its accessories.

The improved draw-head requires and has a very short swell at its mouth end, and parallel sides extend forward to the bosses, in which the ends of the pivot-pin 11 are fast. The drawings represent the greatest length which can be required in practice in front of said pin. A flaring mouth 26, Figs. 3 to 6, which is wide both vertically and horizontally, facilitates the entrance of the link 15 from any direction and its free play in turning curves. A central vertical recess 27, communicating with the inner end of the mouth at top, back, and bottom, is fitted to the detent 10, and at its front, top, and back walls, respectively, form stops 28 29 30 for said detent at the respective limits of its movement. The pair of stops 29 30 for simultaneously arresting the detent 10 at the limit of its backward movement divide the severe strain on the arrested detent, and thus aid to preserve its peculiar shape, hereinafter specified.

The detent 10 is of the peculiar shape represented in Figs. 3 to 5, with two short rigid projections 31 32, hereinafter termed its "finger" and "thumb," the former engaging with said stops 28 and 29 at its respective limits and said thumb engaging with said stop 30. The end of the finger 31 is rounded to coact with the beveled lower end of the catch 12, as in Fig. 4. Its front is flat to coact with the flat back of the said catch, as in Fig. 5, and its back is rounded to match the loop of the round iron link 15, through which it passes when coupled, as in Figs. 1, 2, and 5. The front and back of the thumb 32 may be flat, as shown. The trumpet-shaped notch between finger and thumb is adapted to freely admit the end of the link, as in Figs. 3 and 4, but to allow the same no play therein, or practically none, when the link is coupled, as in Fig. 5. The coupled detent itself is allowed sufficient play to permit the draw-heads to come together without compressing the link, some play between the coupled draw-heads being provided for, as in Figs. 1 and 2, to facilitate starting up heavy trains; but excessive play between the draw-heads is as objectionable as none, and the peculiar detent above described provides for reducing such play to any desired extent with this class of couplings, for the first time, so far as I am informed.

The catch 12 is adapted and intended to be forged in one piece. Its upper end has flanges, which rest on the top of the head to limit its descent, and an eye to receive said ring 23 of the uncoupling devices, and its back has a stop-lug 33 to coact with said keeper 13 when the catch is raised. The upper part of the draw-head 9 has a vertical hole with a groove in its back to receive the catch 12, and a dovetailed seat and screw-hole to receive the keeper 13 and screw 14, as in Figs. 2 and 3.

The front end of the draw-box 18 or 18' is provided with upturned flat hooks 34, Figs. 1 and 2, which embrace the front ends of longitudinal floor-beams of the car. Lateral flanges from which said hooks project extend rearwardly to the knuckle-joints by which the tension-rods 20 are attached, and vertical bolts pass through said hooks and flanges and the floor-beams, as indicated in Fig. 1, to immovably attach the draw-box.

The draw-head 9 is connected with the draw-box by the bars 19 19$^\times$ with the followers 17 and interposed spring 16, as above described. When the draw-heads come together, as in coupling and at stops, the bar 19 and front follower 17 move with the draw-head and compress the spring 16 against the follower on the bar 19$^\times$. When the coupling is under tension, as in Fig. 5, the bar 19$^\times$ and its follower move with the draw-head and the follower 17 on the bar 19 serves as the abutment.

The hand-rod 21, Fig. 8, provides for uncoupling from the top of a box-car, and the other device 22 for uncoupling from the side of the track. Either may be employed without the other, or any improved devices may be substituted for them.

The coupling operation illustrated by Figs. 3, 4, and 5 in series is as follows: The normal positions of the parts in an uncoupled draw-head are as in Fig. 3. The detent 10 gravitates to its position there represented when the catch 12 is raised to uncouple two cars or to prepare for coupling, the detent-finger 31 resting upon said stop 28 below the floor of the mouth 26, and the released catch gravitates to its lowermost position there represented. The entering link 15, passing over said detent-finger 31 and coming into contact with the thumb 32, is already within said contracted notch of the detent and is closely followed by the finger 31 until the latter lifts the catch 12, as in Fig. 4, and the catch drops vertically in front of the finger. The endwise movement of the link necessary to so move the improved detent is barely that ordinarily allowed in pin-and-link couplings, and a standard link consequently suffices. Moreover, the thumb of the detent projects upward at such an angle, owing to the peculiar shape of the detent, as above described, that there is no necessary coaction whatever between the link and the top of the draw-head mouth, and the draw-head may consequently have a high mouth, reducing its weight and facilitating the intercoupling of cars of different heights.

Two draw-heads constructed and furnished according to the drawings and of standard height above the track will couple with each other, without the aid of any link-lifting device, with the link fast in either draw-head. In coupling with higher or lower draw-heads it is advisable to provide the ordinary draw-head with a suitable link, which will then couple with the improved draw-head. It is not necessary in any case to go between the cars to adjust anything. In uncoupling, the weight of the link 15, as well as its own gravity, tends to throw the detent 10 forward as soon as the catch 12 is raised, and thus to uncouple the link immediately, even when the draw-heads are in contact with each other. This is due to said peculiar shape of the detent 10, including the location of the pivot-pin 11 and the relative height of the floor of the draw-head mouth 26, as clearly shown in Figs. 3 to 5.

Having thus described the said improvement, I claim as my invention and desire to patent under this specification—

1. The draw-head 9, having the flaring mouth 26, central vertical recess 27, and stops 28 29 30, and the oscillating detent 10, having the finger 31, which rests on said stop 28, preparatory to coupling, and abuts against said stop 29 when the detent is thrown backward in the coupling operation, and the thumb 32, which abuts against said stop 30 when the detent is thrown backward, in combination with the pivot-pin 11 and with the gravitating catch 12 and the link 15, both of the latter engaging with said finger 31, substantially as hereinbefore specified.

2. The oscillating detent 10, having the round-backed finger 31, the thumb 32, and a contracted trumpet-shaped notch between said finger and thumb, in combination with the pivot-pin 11, located out of line with said finger and notch, a gravitating catch to engage with the extremity of said finger, a round iron link interlocked with said finger, and a draw-head having a central vertical recess within which said detent is pivoted by said pin, and a flaring mouth the bottom of which is below the end of the coupled link as it rests in said notch, substantially as hereinbefore specified.

3. The one-part gravitating catch 12, having the stop-lug 33 on its back, its keeper 13 and fastening-screw 14, and the draw-head 9, having in its top a grooved vertical hole, a dovetailed seat, and a screw-hole therefor and constructed with the flaring mouth 26 and central vertical recess 27, in combination with the detent 10, pivot-pin 11, and link 15, substantially as hereinbefore specified.

GILBERT A. HASLUP.

Witnesses:
  JAS. L. EWIN,
  GEO. M. WHITNEY.